United States Patent
Diehl et al.

(10) Patent No.: US 6,751,594 B1
(45) Date of Patent: Jun. 15, 2004

(54) DEVICE HAVING A VOICE OR MANUAL USER INTERFACE AND PROCESS FOR AIDING WITH LEARNING THE VOICE INSTRUCTIONS

(75) Inventors: Eric Diehl, Liffré (FR); Jiang Shao, Rennes (FR)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/479,603

(22) Filed: Jan. 7, 2000

(30) Foreign Application Priority Data

Jan. 18, 1999 (FR) .............................. 99 00460

(51) Int. Cl.[7] .............................................. G10L 15/00
(52) U.S. Cl. .................... 704/275; 704/270; 379/88.03
(58) Field of Search .................... 704/251, 270, 704/275, 235; 379/88.03, 88.23; 725/52, 61

(56) References Cited

U.S. PATENT DOCUMENTS

| | | | |
|---|---|---|---|
| 6,085,159 A | * 7/2000 | Ortega et al. ............... | 704/235 |
| 6,173,266 B1 | * 1/2001 | Marx et al. ................. | 704/270 |
| 6,182,046 B1 | * 1/2001 | Ortega et al. ............... | 704/275 |
| 6,246,989 B1 | * 6/2001 | Polcyn ....................... | 704/275 |
| 6,308,157 B1 | * 10/2001 | Vanbuskirk et al. ........ | 704/275 |
| 6,321,198 B1 | * 11/2001 | Hank et al. ................. | 704/270 |
| 6,370,238 B1 | * 4/2002 | Sansone et al. ........... | 379/88.23 |
| 6,397,186 B1 | * 5/2002 | Bush et al. ................. | 704/274 |

FOREIGN PATENT DOCUMENTS

WO     WO 96/21990     7/1996

OTHER PUBLICATIONS

IBM Technical Disclosure Bulletin; vol. 33, No. 3A; Aug. 1990 "US Interface Stortcut".
IBM Technical Disclosure Bulletin; vol. 33 No. 11, Apr. 199a "Integrated Audio–Graphics User Interface".
French Search Report.

* cited by examiner

*Primary Examiner*—Daniel Abebe
(74) *Attorney, Agent, or Firm*—Joseph S. Tripoli; Paul P. Kiel

(57) ABSTRACT

The device has a voice and/or manual user interface for accessing its functions. The functions are accessible through a hierarchy of menus in which the branches can be short-circuited by voice instructions referred to as voice short-cuts.

According to the invention, means are provided for storing the sequences of interactions performed by the user and for detecting the cases in which a voice short-cut could have been used instead of the sequence of interactions. In this case, a message is sent to the user in order to inform him or her of the existence of the detected voice short-cut.

The invention also relates to a process for aiding with learning the voice instructions of the device using the means above.

11 Claims, 7 Drawing Sheets

DEVICE HAVING A VOICE OR MANUAL USER INTERFACE AND PROCESS FOR AIDING WITH LEARNING THE VOICE INSTRUCTIONS

BACKGROUND OF THE INVENTION

1. Field of the Invention

The present invention relates to a device having a voice and/or manual user interface and to a process for aiding with learning the voice instructions of such a device. It relates in particular to the field of devices designed to be controlled using a remote control that can be operated by voice or alternatively using buttons.

2. Description of the Related Art

In general, the various functions of a device are accessed through a hierarchy of menus through which the user navigates using buttons on his or her remote control, using voice instructions or optionally buttons fitted to the device itself.

One problem which arises for the users is to know the voice instructions, that is to say the keywords which need to be spoken in order to use them. This is because, even if these keywords are chosen so as to be memorized with ease, if the user does not use them often, he runs the risk of forgetting them and therefore not using the voice instructions.

One first way of aiding users to know the voice instructions consists in implementing the principle of "WYSIWYCS", standing for "What You See Is What You Can Say". That is to say, when a menu contains headings (a heading being a submenu or a function) is displayed on the screen, the user can reach or activate one of the headings by saying the keyword displayed on the screen which corresponds to this heading.

However, the main benefit of voice instruction of the devices over manual instruction involves the use of short-cuts for:

- either directly accessing certain menus or certain functions of the devices by saying a keyword corresponding to the said menu or the said function, without having to perform multiple operations of navigating through the menu, in which case the term navigation voice short-cuts is used;
- or directly activating certain functions, also by saying a keyword corresponding to the said function, without having to enter into any menu, in which case the term activation voice short-cuts is used;
- it being possible for these two possibilities to be combined with voice short-cuts which make it possible both to access a function and activate it.

In this case, the "WYSIWYCS" approach cannot be applied since the user will not necessarily see on screen the keywords which he can say to reach a menu or activate a given function.

SUMMARY OF THE INVENTION

One object of the invention is to solve the problem explained above by making it easier for users to learn and know the voice instructions.

For this purpose, the invention provides a device having a voice and/or manual user interface for accessing its functions, the functions being accessible through a hierarchy of menus in which the branches can be short-circuited by certain voice instructions referred to as voice short-cuts. According to the invention, the device has:

means for storing a sequence of interactions by the user;

means for detecting the existence of a voice short-cut corresponding to the stored sequence of interactions; and means for delivering, in the event that the existence of a voice short-cut is detected, a message to the user in order to inform him or her of the existence of the voice short-cut.

The invention also relates to a process for aiding the learning of voice instructions of a device as mentioned above. This process comprises the steps consisting in:

a) storing a sequence of interactions by the user;

b) testing whether a voice short-cut corresponding to said sequence of interactions exists; and c) in the event that the existence of a voice short-cut is detected, providing means for informing the user of the existence of the voice short-cut.

Thus, as soon as the user uses a complex sequence of interactions to reach a menu or a function of the device even though he could have reached this menu or this function using a voice short-cut, he will be reminded of the use of this voice short-cut. By virtue of the invention, the user will find it very easy to remember the voice short-cuts corresponding to the menus or functions which he accesses most often.

According to a particular embodiment of the invention, step a) comprises:

i) storage of the initial state of the user interface;

ii) detection of an action performed by the user;

iii) storage of the current state of the user interface following this action;

steps ii) and iii) being repeated until one of the following conditions for the end of a sequence of interactions is fulfilled:

the action detected corresponds to the activation of a function; or no action is detected for a period longer than a predetermined limit duration.

It is thus possible to detect both sequences of interactions leading to the activation of a function and those consisting in accessing a menu or a particular function without activating it.

According to a particular embodiment, the user interface has a remote control equipped with buttons and a microphone, and the action detected in step ii) belongs to the set consisting of:

a button on the remote control being pressed; and the microphone picking up a keyword corresponding to a voice instruction.

Advantageously, the process of the invention furthermore comprises the steps consisting in:

iv) providing a use counter associated with each voice instruction of the device;

v) testing whether the action detected in step ii) is a voice instruction which corresponds to a voice short-cut; and vi) incrementing the use counter associated with said voice instruction when the answer to the test above is positive.

According to a preferred aspect of the invention, the storage means of the device include an interaction register comprising:

an "initial state" field in which the initial state of the user interface is stored during step i);

a "current state" field in which the current state of the user interface is stored during step iii).

According to a particular embodiment, step a) furthermore includes:

vii) storage of the use of each voice short-cut detected in step v); and step c) furthermore includes viii) checking that the voice short-cut corresponding to the stored sequence of interactions has not already been used during said sequence of interactions.

According to a preferred aspect of the invention, if in step viii) it is detected that the voice short-cut corresponding to the stored sequence of interactions has not yet been used during said sequence of interactions, then the steps consisting in:

ix) comprise the use counter of the voice instruction corresponding to said voice short-cut with a predetermined threshold, and if the use counter is greater than or equal to the threshold, then x) decrementing the use counter;

else, xi) sending a message to the user informing him or her of the existence of the voice short-cut detected in step b)

are carried out.

Thus, if the user is in the habit of using a voice short-cut but sometimes forgets to employ it, the system reacts "intelligently" by not reminding him or her of the existence of the voice short-cut.

According to another aspect of the invention, means are provided for disabling the process described above for the case when the user does not in general wish to be disturbed by the messages reminding him or her of the voice instructions.

BRIEF DESCRIPTION OF THE DRAWINGS

Other characteristics and advantages of the invention will become apparent from the description below of a particular nonlimiting embodiment of the invention, given with reference to the appended drawings in which:

FIG. 3 represents an example of menu hierarchy for navigating through the menus of the user interface of a device represented in FIG. 1a;

FIGS. 4a to 4e represent examples of menus such as those belonging to the hierarchy represented in FIG. 3, which are displayed on the screen of the device in FIG. 1a;

DESCRIPTION OF THE PREFERRED EMBODIMENT

Figure 1A:
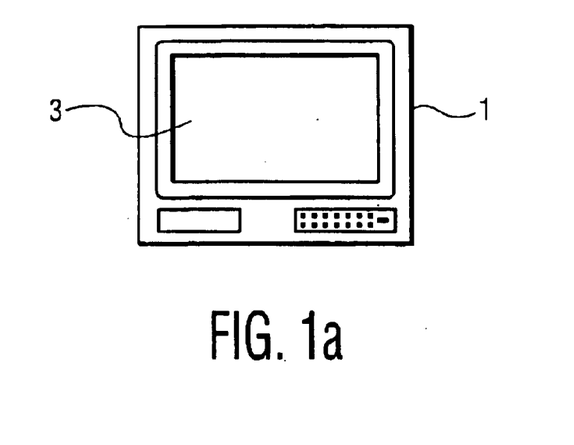
FIGS. 1a and 1b represent an example of a device having a voice and/or manual user interface according to a first aspect of the invention.

FIG. 1a represents a television receiver device, or television set 1, having a screen 3 which makes it possible to display the video picture corresponding to a signal received by the tuner of the television set or coming from an external source connected to the television set, such as a video cassette recorder. The screen 3 is also used to display the navigation menus of the user interface of the television set.

Figure 1B:
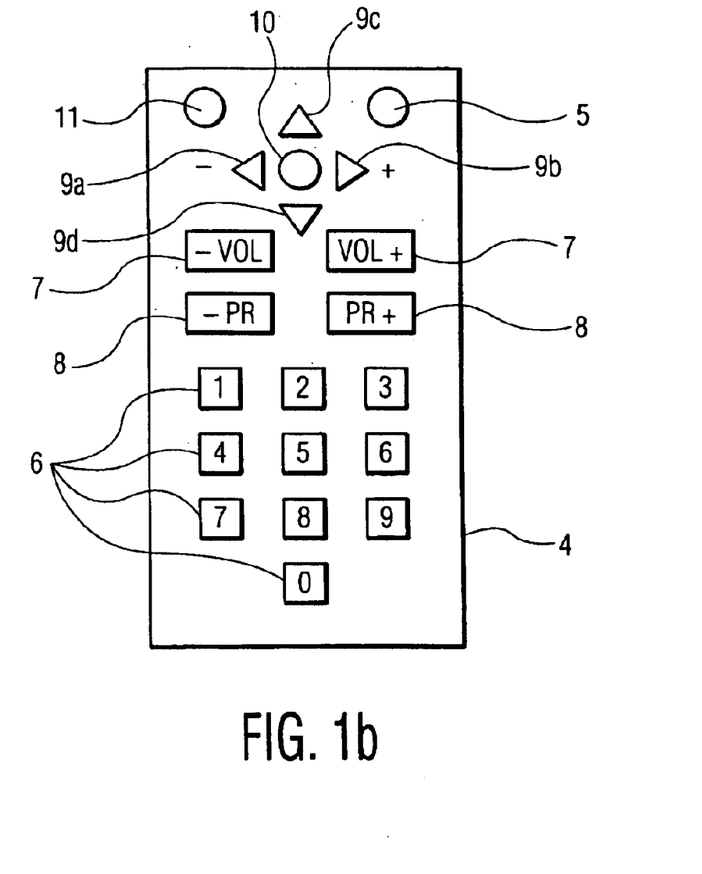

The rest of the description will be given with reference to the television receiver device 1 whose user interface comprises a remote control, of the type represented in FIG. 1b, which is multimode, that is to say can be operated by voice or by pressing buttons, is fitted with buttons 5–11 for manual operation of the functions of the television set and includes a microphone (not shown) for voice instruction of the said functions. Naturally, however, the invention applies more generally to any type of device whose functions can be activated by voice and/or manual instruction, such as a video cassette recorder or a decoder for the signal received from a satellite or via cable.

In order to activate the functions of the television set manually, the user can either use traditional buttons on his or her remote control (buttons 7 for adjusting the volume "Vol.+" and "Vol.–", buttons 8 for running through the channels "PR+" and "PR–" or buttons 6 for selecting a particular channel), or call up a main menu using button 5, move through this menu using the navigation buttons 9c; 9d and select a menu or activate a particular function using the activation button 10, or alternatively make an adjustment using the buttons "+" 9b and "–" 9a. A button 11 is furthermore provided for exiting the menu. An example of such a menu will be described below with reference to FIG. 3.

The remote control 4 also includes a microphone (not shown) for allowing the user to reach or activate functions of the television set by voice. A transmitter (not shown) of high-frequency signals (HF) is furthermore provided which, on the one hand, receives the signals corresponding to operation of the buttons, conditioned by a coding circuit, and on the other hand the audio signals picked up by the microphone, and transmits these instruction signals to the television set.

Figure 2:
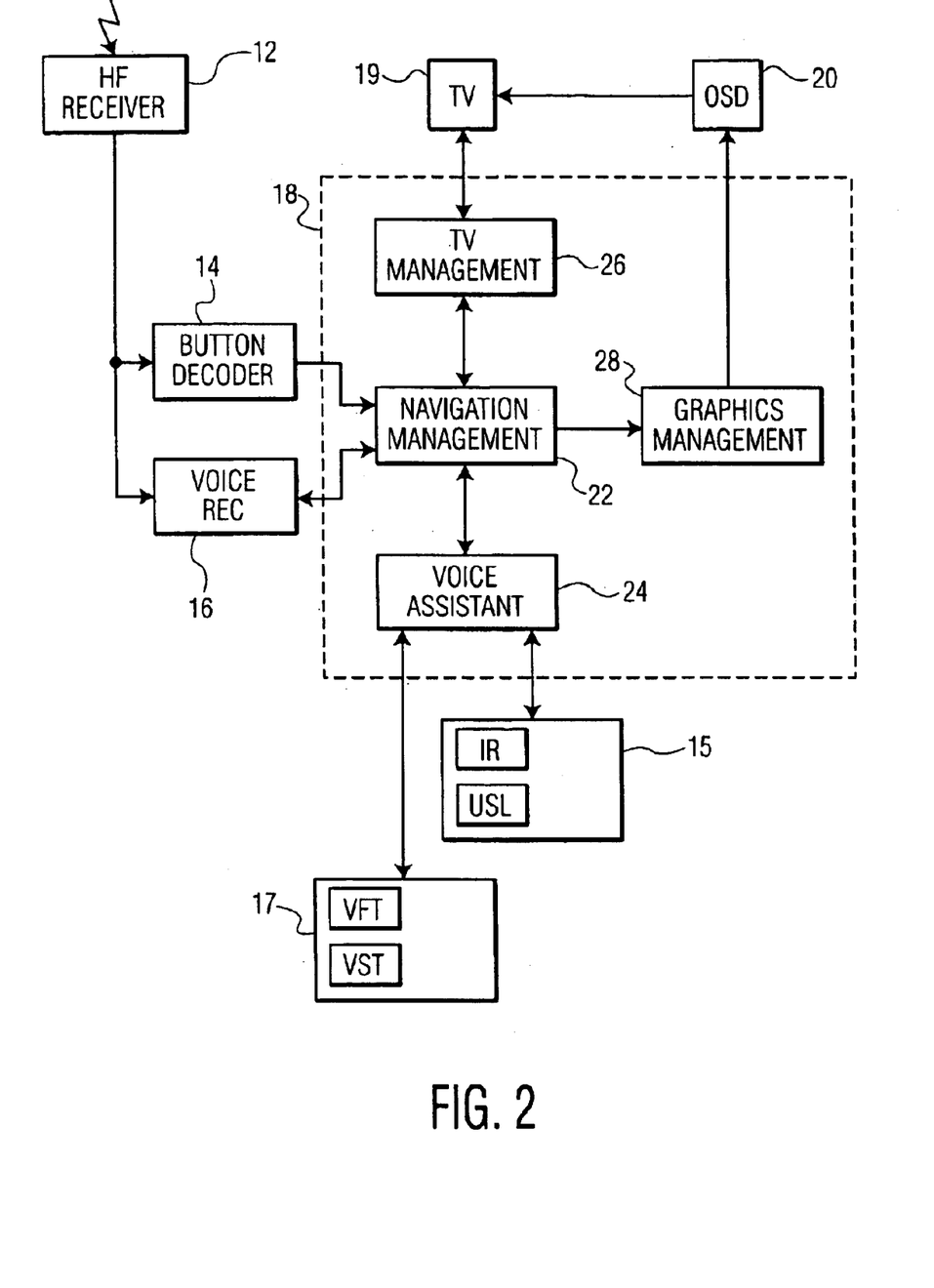
FIG. 2 represents, in block-diagram form, the circuits with which a device represented in FIG. 1a is equipped.

FIG. 2 represents the elements of the television set 1 for processing the signals delivered by the remote control 4.

A high-frequency (HF) receiver 12 receives the signals sent by the transmitter of the remote control. It delivers the signals coming from the buttons of the remote control to a button-decoder circuit 14, on the one hand, and the signals coming from the microphone to a voice-recognition circuit 16, on the other hand. The circuits 14 and 16 are connected to a microprocessor, of which only one functional unit 18, the system for managing the user interface, has been represented in FIG. 2. This unit 18 comprises a navigation management module 22 which manages the progress through the hierarchy of menus as a function of the instruction signals received from the circuits 14 and 16.

The navigation management module 22 is connected to a first TV management module 26 which manages various functions of the television set, such as volume, changing channel, brightness, contrast, etc. and which is connected to the circuits 19 of the television set. The module 22 is also connected to a second, voice-assistant module 24 which, according to the invention, continuously scrutinizes and stores the interactions performed by the user in order to detect the cases in which he or she could have used a voice short-cut instead of a longer series of interactions to reach a function of the television set.

The module 22 is lastly connected to a third, graphical management module 28 which controls a circuit 20 for displaying data on screen, often referred to as an OSD circuit standing for "On Screen Display". The OSD circuit 20 is a text and graphics generator which makes it possible to display menus and pictograms on the screen and which makes it possible, according to a preferred aspect of the invention, to display messages intended for the user in order to inform him or her of the existence of voice short-cuts when he does not use them.

Furthermore, a memory 15 of the volatile type and a memory 17 of the nonvolatile type are connected to the microprocessor and are used, as will be seen below, by the voice-assistant module 24 to store respectively nonpersistent and persistent data.

The voice-assistant 24, TV management 26 and graphical management 28 modules form part of the management system 18 of the user interface. The links between the navigation management module 22 and the TV management 26 and voice-assistant 24 modules are of the two-way type, as is the link between the module 26 and the circuits of the television set 19 and the link between the module 24 and the memories 15 and 17. Similarly, the voice-recognition circuit 16 is connected to the module 22 by a two-way link.

Figure 3:
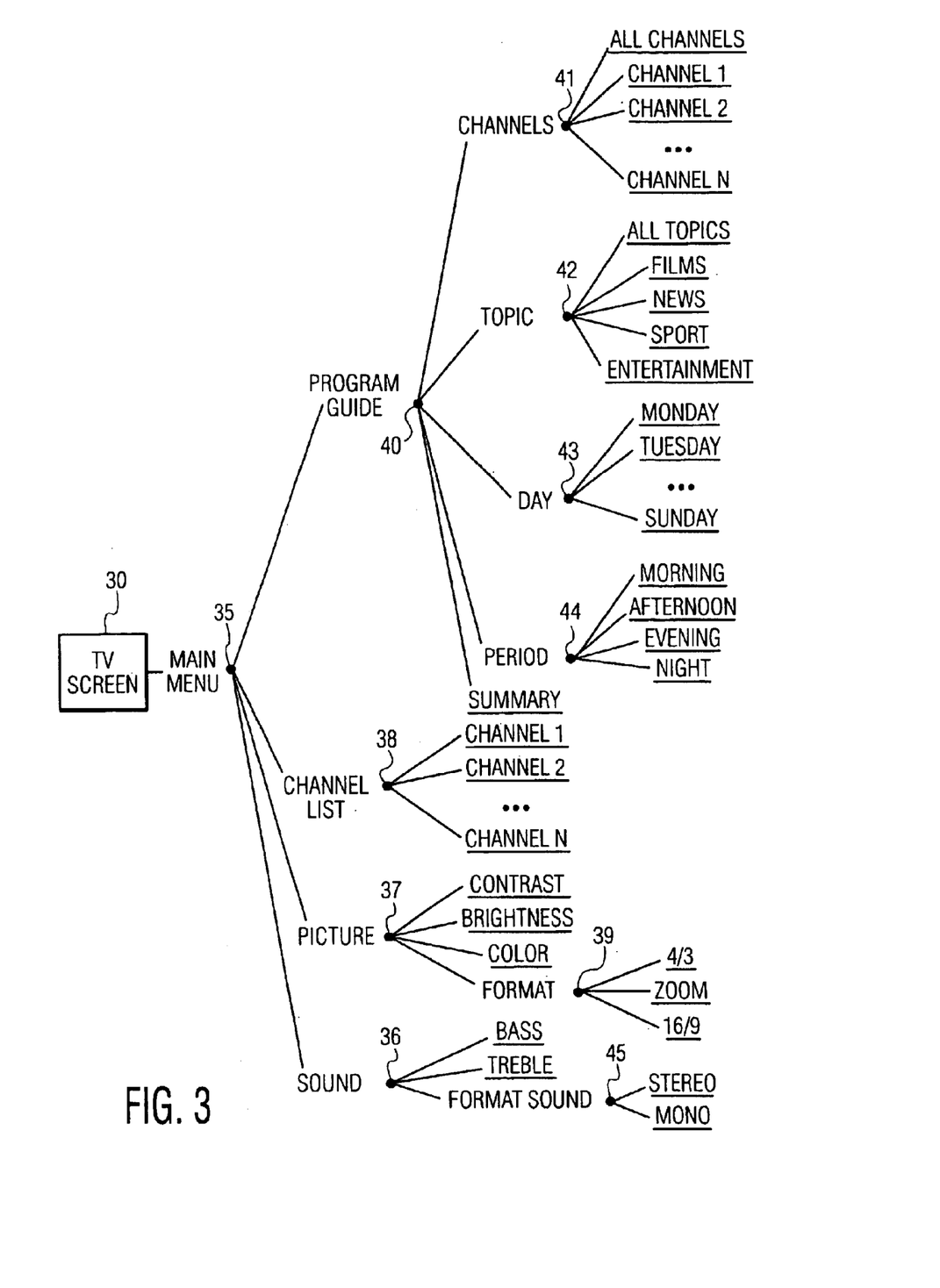

FIG. 3 represents the hierarchy of menus for accessing the various functions of the television set. This tree comprises an initial node 30 labelled "TV SCREEN" which corresponds to the state in which a televised programme is being displayed on the screen of the television set. All the nodes 35–45 internal to the tree, which are represented in FIG. 3 by black spots, are navigation nodes while the nodes corresponding to the "leaves" of the tree, which are represented by underlined words, are unction nodes. The navigation nodes correspond either to menus covering several functions, for example the "PICTURE" menu located at node 37, or to function fields covering several options, for example the "FORMAT" field located at node 39 in the "PICTURE" menu.

The menu hierarchy represented in FIG. 3 is given by way of example, and it is entirely conceivable to apply the invention with menus containing other functions.

The "MAIN MENU" menu located at node 35 is selected when the user presses a button 5 of the remote control (FIG. 1b) or when he says the "main menu" keyword to the microphone of his or her remote control. The "MAIN MENU" menu provides access to four menus which are displayed in a window in overlay on the current video picture: a programme guide 40, the list of available channels 38 and the setting of certain parameters of the picture 37 and the sound 36. Each of these menus 36, 37, 38, 40 makes it possible to access either function fields covering several options which appear in the form of navigation nodes 39, 41–45 in FIG. 3, or functions of the television set directly (underlined words).

In order to access the various headings of the hierarchy, the user can either adopt the conventional procedure of using the navigation 9c; 9d and activation 10 buttons of the remote control, or use the voice instruction by saying one of the keywords corresponding to the title of the headings proposed.

FIGS. 4a to 4e illustrate the appearance of various windows which are shown on the screen of the television set when the user is navigating through the hierarchy represented in FIG. 3.

Let us assume that the user is currently watching a televised programme, that is to say he or she is at node 30 of the hierarchy (FIG. 3), and he or she wishes to adjust the contrast of his or her television set.

Figure 4A:
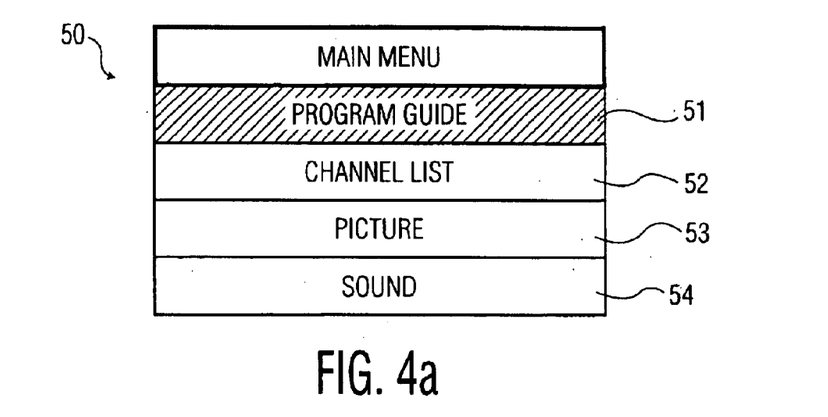
Figure 4B:
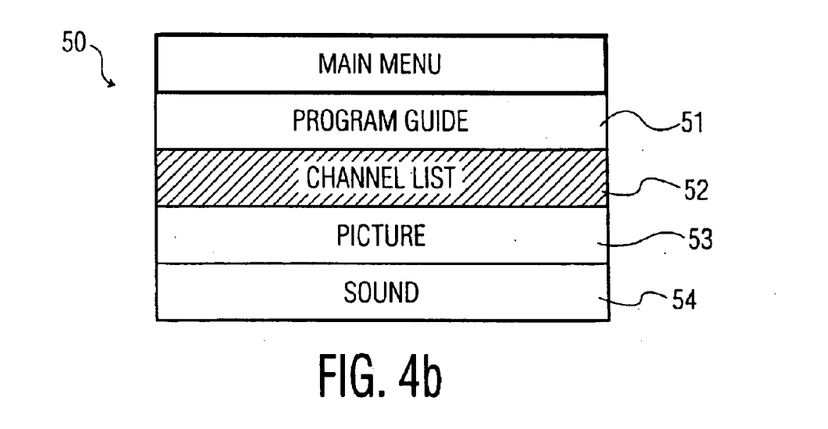
Figure 4C:
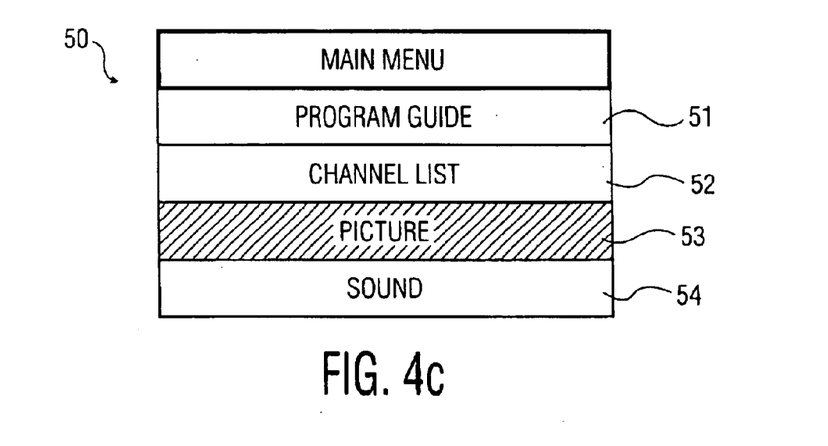

If he or she is only using that manual interface, that is to say the buttons on the remote control 4, he or she adopts the following procedure: he or she firstly presses button 5 which causes the "MAIN MENU" window 50 to be displayed on the screen (FIG. 4a). This window has four headings 51 to 54 corresponding to the four menus 36–40 accessible from the "MAIN MENU". When the window 50 is displayed, the first heading "PROGRAMME GUIDE" is selected by default, which is why heading 51 is highlighted in FIG. 4a. To reach the "PICTURE" menu in which the "CONTRAST" function is located, the user needs to press twice on the navigation button 9d, the first time to select heading 52 (FIG. 4b) and the second time to select heading 53 (FIG. 4c). He or she then needs to press on the activation button 10 to bring about display of window 60 (FIG. 4d) containing the various functions of the "PICTURE" menu.

Figure 4D:
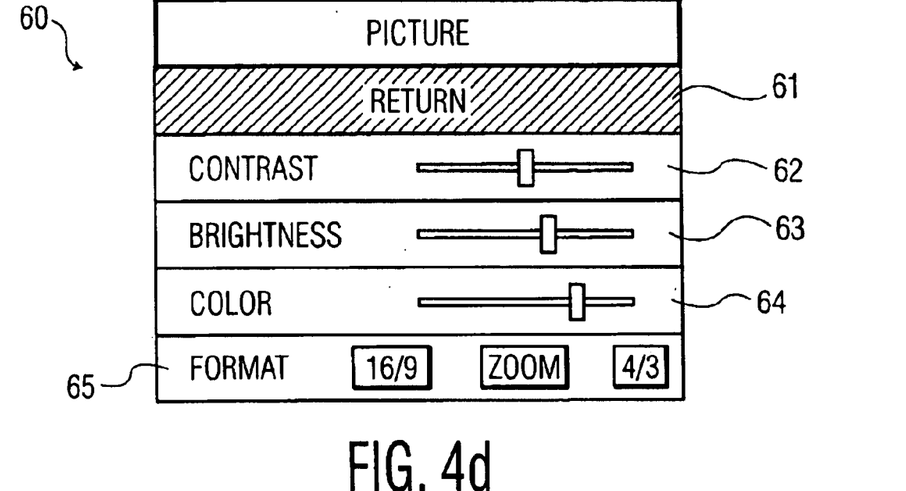

This window 60 contains headings 62–65 corresponding to the functions accessible from node 37 (FIG. 3). It also contains a "RETURN" heading 61 which, when activated, makes it possible to return to the "MAIN MENU". This "RETURN" heading, although not represented in the hierarchy in FIG. 3, is in fact present in all the menus and submenus of the hierarchy apart from the "MAIN MENU".

Figure 4E:
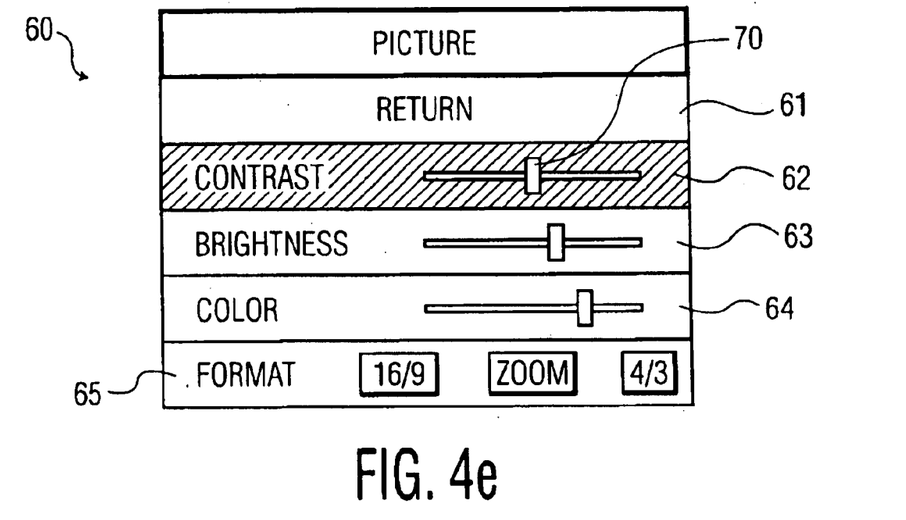

In order to reach the "CONTRAST" function, the user also needs to press once on button 9d, which modifies the appearance of window 60 as represented in FIG. 4e. At this stage, the user can adjust the contrast by using buttons 9a; 9b, which moves the cursor 70 displayed in the box corresponding to the heading 62 of window 60.

To carry out the same operation, namely adjust the contrast of the television set from the initial node 30 of the menu hierarchy, the user can also use the voice interface. This solution is much more advantageous since it allows him or her to take short-cuts through the hierarchy.

Thus, all the user needs to do is say the "contrast" keyword for the window 60 to be displayed immediately on the screen with the appearance represented in FIG. 4e, that is to say with the "CONTRAST" function selected. The "contrast" voice instruction therefore constitutes a voice short-cut in this context since it makes it possible for the corresponding function to be reached directly without the need to perform five operations, as is the case with manual instruction.

It can be noted that it is also possible to perform the operations described above with reference to FIGS. 4a to 4e by using voice instructions according to the "WYSIWYCS" principle. This slightly shortens the sequence of interactions compared with manual instruction, because the user can move directly from the window represented in FIG. 4a to the one represented in FIG. 4d by saying the "picture" keyword. Even in this case, however, the sequence of interactions is longer than when the user uses the "contrast" voice short-cut from the start.

According to the invention, all the cases when the user uses a long sequence of interactions (using manual and/or voice instructions) to reach a menu or function, or to activate a functions, when he or she could have performed the same operation faster using a voice short-cut, will be detected. Following this detection, the user is informed of the existence of this voice short-cut so that he or she can get used to using the voice short-cuts.

In order to detect the existence of voice short-cuts, the principle is to store the sequences of interactions by the user and see whether the starting node and the finishing node of the sequence of interactions are separated by at least one navigation node.

A sequence of interactions by the user is made up of interactions which comprise: an action by the user as well as the state of the user interface following the action, that is to say the node currently occupied in the hierarchy following the action.

An action by the user corresponds:

either to pressing a button on the remote control;

or to saying a keyword corresponding to a voice instruction.

An action leads either to movement through the navigation tree or to activation of a function.

A sequence of interactions ends:

either with the activation of a function;

or with the user taking no action for a duration longer than a limit duration, fixed for example at 5 to 10 seconds.

In practice, according to a preferred embodiment, the state of the user interface is stored before the start of the sequence of interactions, and the current state of the user interface is stored as the user performs interactions. When a sequence of interactions is ended, the initial state and the final current state of the user interface are then compared and, as will be seen below, it is deduced from this whether a voice short-cut could have been used to perform the same sequence of interactions.

In order to do this, an interaction register IR will preferably be used. It comprises two fields: an "Initial state" field and a "Current state" field. This interaction register IR is, for example, produced by saving two memory locations in the volatile-type memory 15 to which the microprocessor comprising the functional unit 18 is connected (FIG. 2).

Table 1 below illustrates the change in the contents of the interaction register in the case corresponding to the example described above with reference to FIGS. 4a to 4e:

TABLE 1

Interaction register

| FIGS. | Initial state | Current state |
|---|---|---|
| / | TV SCREEN | TV SCREEN |
| 4a | TV SCREEN | MAIN MENU (PROGRAMME GUIDE) |
| 4b | TV SCREEN | MAIN MENU (CHANNEL LIST) |
| 4c | TV SCREEN | MAIN MENU (PICTURE) |
| 4d | TV SCREEN | PICTURE (RETURN) |
| 4e | TV SCREEN | PICTURE (CONTRAST) |

In the example above, when the sequence of interactions is ended, the interaction register IR therefore contains the "TV SCREEN" state in its "Initial state" field and, in its "Current state" field, the state corresponding to selection of the "CONTRAST" function from the "PICTURE" menu. In practice, each state of the interface has a corresponding code, and it is these codes which are stored in the memory locations forming the interaction register IR.

In order to detect the existence of a voice short-cut corresponding to a stored sequence of interactions, a table referred to as the "Voice Function Table" is used which, for each "Starting state" of the user interface, contains a list of all the "Final states" which can be accessed from this "Starting state" by voice instruction, as well as the corresponding keyword which needs to be said.

This voice function table VFT depends on the menu hierarchy which is defined at the start for the user interface. It is stored by the management system of the user interface in the nonvolatile memory 17 (FIG. 2). This table VFT comprises four columns: a "Starring state" column, a "Final state" column, a "Voice instruction" column containing the corresponding keywords and, according to a preferred embodiment of the invention, a "Voice short-cut indicator" column which indicates whether or not, when moving from the "Starting state" to the "Final state" by using the "Voice instruction", this constitutes a voice short-cut. When the "Voice short-cut indicator" is equal to "1" this means that the "Voice instruction" constitutes a voice short-cut. In the converse case, when the "Voice short-cut indicator" is equal to "0", this means that it is not a voice short-cut.

For example, part of the voice function table VFT corresponding to the menu hierarchy in FIG. 3 has been represented below (Table 2):

TABLE 2

Voice function table

| Starting state | Final state | Voice instruction | Voice short-cut indicator |
|---|---|---|---|
| TV SCREEN | MAIN MENU (PROGRAMME GUIDE) | "main menu" | 0 |
| TV SCREEN | PROGRAMME GUIDE (CHANNELS) | "programme guide" | 1 |
| TV SCREEN | CHANNEL LIST (CHANNEL 1) | "channel list" | 1 |
| TV SCREEN | PICTURE (RETURN) | "picture" | 1 |
| . . . | . . . | . . . | . . . |
| TV SCREEN | PICTURE (CONTRAST) | "contrast" | 1 |
| TV SCREEN | PICTURE (BRIGHTNESS) | "brightness" | 1 |
| TV SCREEN | PICTURE (COLOUR) | "colour" | 1 |
| TV SCREEN | PICTURE (FORMAT = 16/9) | "sixteen to nine" | 1 |
| . . . | . . . | . . . | . . . |
| PICTURE (RETURN) | PICTURE (CONTRAST) | "contrast" | 0 |
| PICTURE (RETURN) | PICTURE (BRIGHTNESS) | "brightness" | 0 |
| . . . | . . . | . . . | . . . |
| PICTURE (RETURN) | PROGRAMME GUIDE (CHANNELS) | "programme guide" | 1 |

In order then to detect whether a sequence of interactions which has been stored in the interaction register IR can be replaced by a voice short-cut, all that needs to be done is to look in the VFT table to see whether:

for a "Starting state" equal to the "Initial state" of the interaction register IR, it is possible to find:

a "Final state" equal to the "Current state" of the interaction register IR such that:

the "Voice short-cut indicator" is equal to "1".

If all these conditions are combined, then it can be deduced from this that the corresponding "Voice instruction" constitutes a voice short-cut of the sequence of interactions which is stored in the interaction register IR.

Thus, in the case of the sequence which was illustrated by Table 1, a search will be made in the VFT table as to whether, for a "Starting state" equal to "TV SCREEN", a "Final state" equal to "PICTURE (CONTRAST)" can be found (that is to say the state in which the "CONTRAST" function is selected from the "PICTURE" menu) such that the corresponding "Voice short-cut indicator" is equal to "1". These conditions are found in combination in Table 2 (row 6), which means that there is a voice short-cut for reaching the same end state as that of the stored sequence of interactions. It can furthermore be seen in Table 2 that the "Voice instruction" corresponding to this voice short-cut is "contrast".

According to the invention, it will therefore be indicated to the user by a suitable message that he or she could have used the voice short-cut consisting in saying the word "contrast". This message may advantageously be delivered in the form of text which appears in a window on the screen of the television set. It may also be delivered in audible form using a voice synthesizer or, alternatively, in both visual and audible form.

Figure 5A:
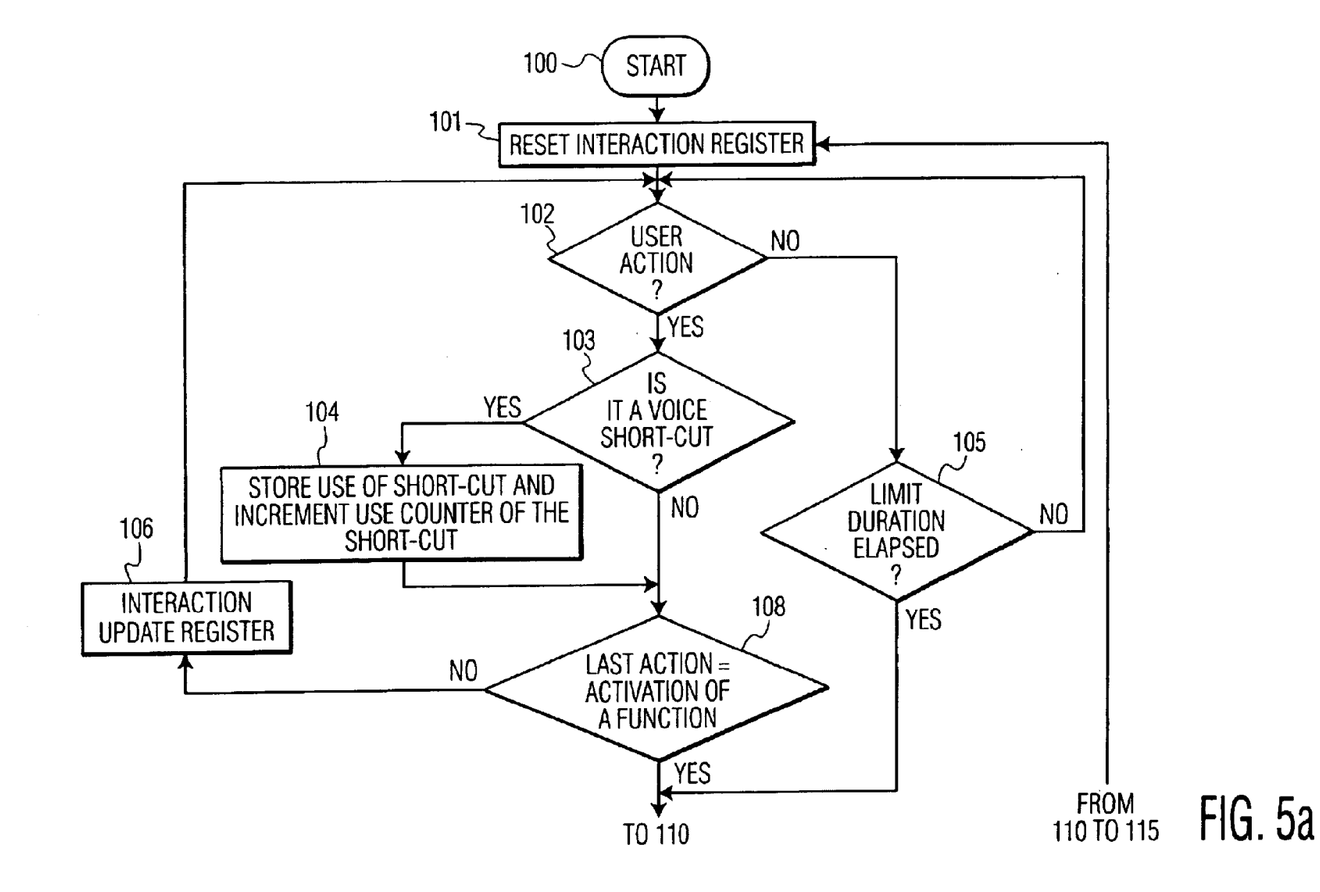
FIGS. 5a and 5b represent a flow chart illustrating the various steps in the process according to a second aspect of the invention.
Figure 5B:
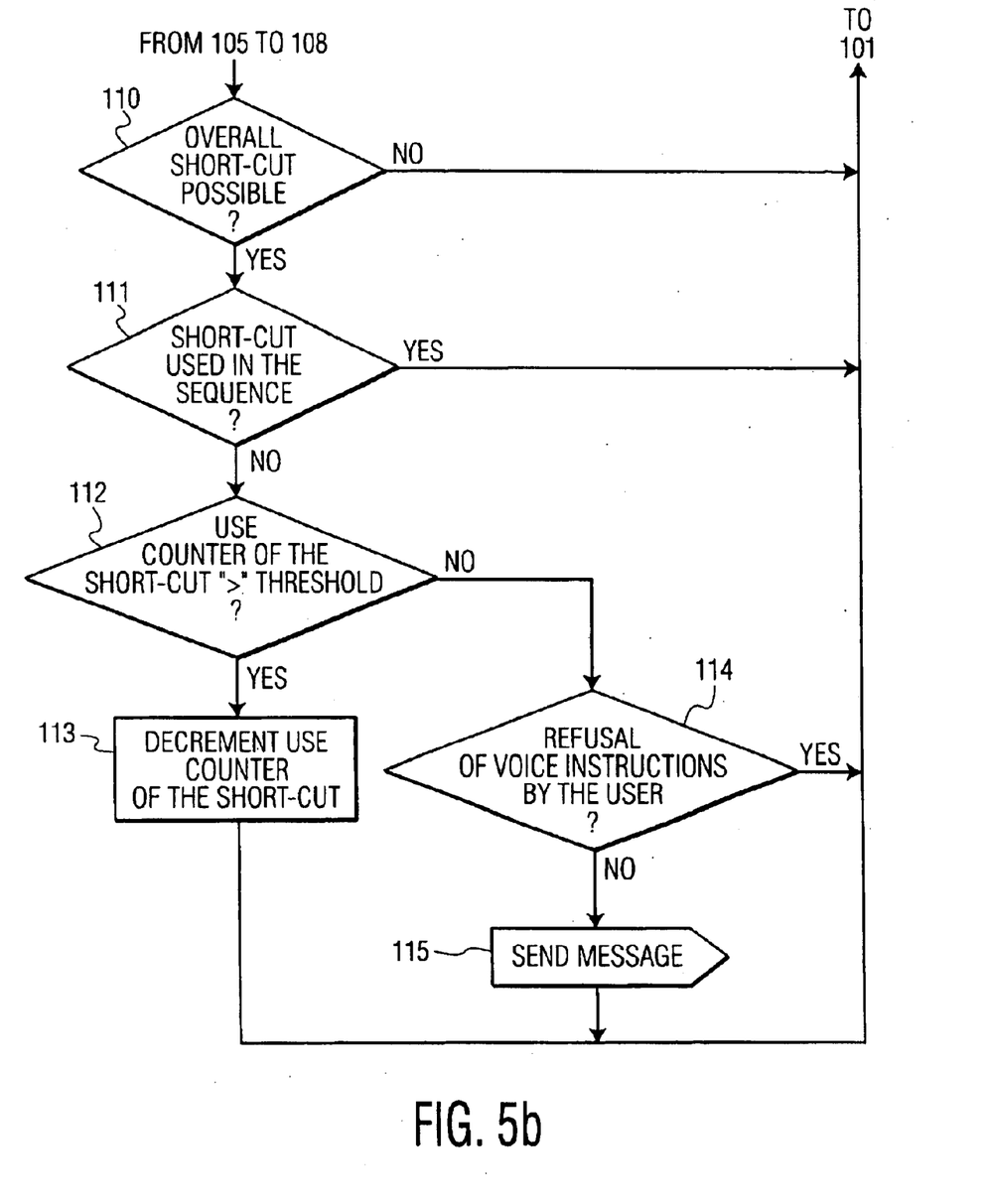

The flow chart represented in FIGS. 5a and 5b represents various steps in the process for aiding with learning the voice instruction of the television set according to the invention, which process is implemented by the voice-assistant module 24 described with reference to FIG. 2.

After a starting step 100 during which various initializations of the system are carried out, the process starts with a first step 101 of resetting the interaction register IR. This step consists in initializing the "Initial state" field and the "Current state" field of the interaction register IR with the current state of the user interface.

During this step 101, a list referred to as the "used short-cut list" USL is also reset. This list USL is preferably stored in the volatile-type memory 15 (FIG. 2) in which the interaction register IR is also stored. It is used, as will be seen below in the description of the process, to store the voice short-cuts which are used during a sequence of interactions.

The process continues with a first test 102 to check whether or not the user has performed an action. If the answer is yes, then a second test 103 is carried out to check whether or not the action performed by the user is a voice short-cut. This test is carried out as follows, each time a new action by the user is detected.

Firstly, a check is made as to whether the action detected in test 102 is a voice instruction. If the answer is no, then the answer to the test 103 will also be negative. If, however, the detected action is a voice instruction, then a search will be made as to whether or not this voice instruction constitutes a voice short-cut. In order to do this, the voice function table VFT is used and a search is made as to whether:

for a "Starting state" equal to the "Current state" of the interaction register IR, it is possible to find:
a "Voice instruction" equal to the voice instruction identified in the action detected in step 102, such that:
the "Voice short-cut indicator" is equal to "1".

If the answer to this test is positive, then we move on to step 104 which consists in storing the use of the voice short-cut in the list USL and incrementing a "Use counter" for the short-cut.

In fact, a use counter is associated with each voice instruction apart from those which cannot ever constitute voice short-cuts. For example, in the "PROGRAMME GUIDE" menu, the "SUMMARY" function can only ever be activated from the "PROGRAMME GUIDE" menu. The "summary" voice instruction cannot therefore ever constitute a voice short-cut. In practice, a "Voice short-cut table" VST comprising a "Voice instruction" column as well as a "Use counter" column will be stored. This table is constructed by copying into the "Voice instruction" column of the voice function table VFT all the voice instructions which have at least once a "Voice short-cut indicator" equal to "1".

Each time the use of a voice short-cut is detected in step 103, the use counter of the associated voice instruction is incremented (step 104). Conversely, each time a voice short-cut could have been used to access a function but the user uses a longer sequence of interactions, the use counter of the associated voice instruction is decremented (step 113 described below).

This makes it possible, as will be seen below, not to inform the user of the existence of a voice short-cut when he or she is in the habit of using it (in this case, its use counter will be high) but occasionally forgets to employ it.

When the use counter of a voice short-cut is incremented in step 104, the voice instruction corresponding to this short-cut is also stored in the list USL of short-cuts used. This list USL will be subsequently used in step 111.

If the answer to the test in step 103 is negative, then we move on to another test (step 108) to check whether or not the last action performed, detected in step 102, corresponds to the activation of a function. In fact, if the answer to this test is negative, it is assumed that the sequence of interactions is not ended and, in this case, we move on to a step 106 of updating the interaction register then we return to step 102. Step 104 described above is also always followed by this step 108.

Step 106 consists in storing the current state of the user interface, that is to say the state of the interface following the action detected in step 102, in the "Current state" field of the interaction register IR.

If the answer to test 108 is positive, then we move on to step 110.

When the first test 102 of detecting an action by the user is negative, another test is carried out in step 105 to check whether the limit duration, fixed for example at 5 or 10 seconds, has elapsed. If it has not, we return to step 102 to test whether the user performs an action. If, however, the limit duration has elapsed, it is assumed that the sequence of interactions is ended and we move on to step 110.

When we reach step 110, this means that the sequence of interactions is ended and that the "Initial state" and the final "Current state" of this sequence of interactions are stored if the interaction register IR. In step 110, a test is then carried out, using the method explained above (following the description of the table VFT), as to whether the sequence of interactions that was stored in the interaction register IR can be replaced in full by a voice short-cut.

If the result of test 110 is negative, that is to say if no possible overall voice short-cut is detected for the stored sequence of interactions, then we return to step 101 to start storing a new sequence of interaction. However, in the event that the result or test 110 is positive, that is to say an overall voice short-cut corresponding to the stored sequence of interactions is detected, then in step 111 a check is made that this voice short-cut has not already been used in the sequence of interactions. This is because it is possible for the user to perform a number of interactions by navigating through the hierarchy of menus, for example through the programme guide, then use a voice short-cut to reach, for example, the function of adjusting the brightness by saying the "brightness" keyword. In this case, there is no point in reminding the user of the existence of the voice short-cut. In order to detect whether the voice short-cut, for example "brightness", has been used during the sequence of interactions, a check is made as to whether or not the "brightness" voice instruction is present in the list USL of the short-cuts used.

If the test in step 111 is positive, the voice short-cut detected in step 110 having already been used during the sequence of interactions, then we return to step 101. In the converse case, the process continues with step 112 which consists in testing whether the use counter for the voice instruction (stored in the table VST) is greater than or equal to a predetermined threshold, for example set at 5. This is equivalent to testing whether or not, in the past, the user has already used the voice short-cut more than five times. If the answer to this test is positive, the use counter for the voice short-cut will be decremented in step 113 but it would be considered superfluous to remind the user of the existence of the voice short-cut because he or she has already used it several times, and we return to step 101.

Conversely, if the answer to test 112 is negative, it is necessary to remind the user of the existence of the voice short-cut. Before this, an additional test is carried out in step 114 with a view to detecting whether or not the user is deliberately refusing to use use voice instructions, for example so as not to disturb the people around him or her. In order to do this, a first counter A counts down the time elapsed since the last use of a voice instruction by the user. This counter is time-based by the clock of the system and is reset each time a new voice instruction is detected, or alternatively when the television set is turned to standby. A second counter B is provided for counting the number of times that a reminder of the existence of a voice short-cut has been given during the period counted down by the counter A. This counter is incremented each time a voice short-cut is suggested to the user, and is reset each time a new voice instruction is used.

In order to carry out the test 114, we look whether the value of the counter A is greater than or equal to a predetermined duration, for example 15 minutes, and whether the value of the counter B is greater than or equal to a predetermined number of suggestions of voice short-cuts, for example 5. If the result of the test is positive, then there is no point in informing the user of the existence of the voice short-cut detected in step 110, and we return to step 101 to start storing a new sequence of interactions.

In the event that the result of test 114 is negative, then it is assumed that the user is not systematically refusing the voice instructions and, in step 115, he or she is sent a message to inform him or her of the existence of the voice short-cut detected in step 110. This message may be delivered in the form of text displayed on the screen of the television set, or alternatively in audible form using a voice synthesizer.

It is furthermore advantageous to provide a means of deactivating the voice-assistant module 24 when the user intentionally does not wish to be disturbed by the messages which the voice assistant sends to remind him or her of the existence of the voice instruction. In order to do this, it is in bottom (not shown) on the remote control or alternatively a specific heading (not shown) in the menu hierarchy.

What is claimed is:

1. A device having a voice and/or manual user interface for accessing its functions, said functions being accessible through a hierarchy of menus in which the branches can be short-circuited by certain voice instructions referred to as voice short-cuts, wherein said device has:
    means for storing a sequence of interactions by the user;
    means for detecting the existence of a voice short-cut corresponding to the stored sequence of interactions;
    means for checking that said voice short-cut corresponding to the stored sequence of interactions has not been used during said sequence of interactions; and
    means for delivering, in the event that the existence of a voice short-cut is detected and that said corresponding voice short-cut has not been used, which voice short-cut said user did not employ when interfacing with said device to access said functions, a message to the user in order to inform him or her of the existence of said voice short-cut.

2. A method for aiding the learning of voice instructions of a device having a voice and/or manual user interface for accessing its functions, said functions being accessible through a hierarchy of menus in which the branches can be short-circuited by certain voice instructions referred to as voice short-cuts, said method comprising the steps of:
    a) storing a sequence of interactions by the user;
    b) testing whether a voice short-cut corresponding to said sequence of interactions exists; and
    c) in the event that the existence of a voice short-cut is detected, which voice short-cut said user did not employ when interfacing with said device during said sequence of interaction to access said function, providing means for informing the user of the existence of said voice short-cut.

3. The method according to claim 2, wherein step a) comprises:
    i) storing the initial state of the user interface;
    ii) detecting an action performed by the user;
    iii) storing the current state of the user interface following this action;
    steps ii) and iii) being repeated until one of the following conditions for the end of a sequence of interactions is fulfilled:
        the action detected corresponds to the activation of a function; or
        no action is detected for a period longer than a predetermined limit duration.

4. The method according to claim 3, wherein the user interface has a remote control equipped with buttons and a microphone, and wherein the action detected in step ii) belongs to the set of consisting of:
    a button on the remote control being pressed; and
    the microphone picking up a keyword corresponding to a voice instruction.

5. The method according to claim 3, further comprising the steps consisting in:
    iv) providing a use counter associated with each voice instruction of the device;
    v) testing whether the action detected in step ii) is a voice instruction which corresponds to a voice short-cut; and
    vi) incrementing the use counter associated with said voice instruction when the answer to the test above is positive.

6. The method according to claim 5, wherein step a) furthermore includes:
    vii) storing the use of each voice short-cut detected in step v).

7. The method according to claim 6, wherein if it is detected that the voice short-cut corresponding to the stored sequence of interactions has not yet been used during said sequence of interactions, then the steps consisting in:
    ix) comparing the use counter of the voice instruction corresponding to said voice short-cut with a predetermined threshold, and
        if the use counter is greater than or equal to said threshold, then
    x) decrementing said use counter;
    xi) not sending the message to the user informing him or her of the existence of the voice short-cut detected in step b) are carried out.

8. The method according to claim 7, further comprising the steps of:
    xii) providing a counter A counting down the time elapsed since the last use of a voice instruction by the user;
    xiii) providing a counter B counting the number of messages sent to the user during the period counted down by the counter A; wherein a test is carried out before sending the message to detect whether the value of the counter A is greater than or equal to a predetermined duration and, if the value of the counter B is greater than or equal to a predetermined number of messages, the sending of the message being carried out only in the event of a negative reply to said test.

9. The method according to claim 3, further comprising providing an interaction register comprising:
- an "Initial state" field in which the initial state of the user interface is stored during step i);
- a "Current state" field in which the current state of the user interface is stored during step iii).

10. The method according to claim 9, further comprising providing a voice function table comprising, for each "Starting state" of the user interface, a list of all the "Final states" as a function of the "Voice instructions" used, as well as a "Voice short-cut indicator" indicating whether or not the change from one "Starting state" to one "Final state" by using a "Voice instruction" constitutes a voice short-cut;

and in that step v) is carried out by testing whether:
- I.) the action detected in step ii) is a voice instruction and, if the answer to the test I.) is positive,
- II.) by testing whether
  - for a "Starting state" equal to the "Current state" of the interaction register, it is possible to find:
    - a "Voice instruction" equal to the voice instruction identified during test I.), such that:
    - the "Voice short-cut indicator" indicates the existence of a voice short-cut.

11. The method according to claim 10, wherein step b) is carried out by testing, in the voice function table, whether:
- for a "Starting state" equal to the "Initial state" of the interaction register, it is possible to find:
  - a "Final state" equal to the "Current state" of the interaction register such that:
  - the "Voice short-cut indicator" indicates the existence of a voice short-cut.

* * * * *